US007351463B2

(12) United States Patent
Chen

(10) Patent No.: US 7,351,463 B2
(45) Date of Patent: Apr. 1, 2008

(54) DOWN-FEATHER AND MANMADE FIBER MIXED FILLER AND PRODUCT MANUFACTURING FROM THE SAME

(75) Inventor: Cheng Hwa Chen, Taipei (TW)

(73) Assignee: Kwong Lung Enterprise, Taipei (TW)

( * ) Notice: Subject to any disclaimer, the term of this patent is extended or adjusted under 35 U.S.C. 154(b) by 393 days.

(21) Appl. No.: 11/204,931

(22) Filed: Aug. 17, 2005

(65) Prior Publication Data

US 2007/0042169 A1 Feb. 22, 2007

(51) Int. Cl.
*B32B 3/02* (2006.01)

(52) U.S. Cl. .......................... 428/76; 428/74; 442/416; 19/65 R

(58) Field of Classification Search ............. 428/292.1, 428/359, 369, 74, 76; 442/416; 19/65 R; 366/2
See application file for complete search history.

(56) References Cited

U.S. PATENT DOCUMENTS 2,684,337 A * 7/1954 Frederick ....................... 428/6
4,364,996 A * 12/1982 Sugiyama ................... 428/369
5,286,556 A * 2/1994 Tesch .......................... 428/68
6,232,249 B1 * 5/2001 Kawada ...................... 442/352
2007/0105469 A1 * 5/2007 Manner et al. ............. 442/197

* cited by examiner

*Primary Examiner*—N. Edwards

(57) ABSTRACT

A down-feather and manmade fiber filled product has an outer layer, an inner layer, and a filler filled between the outer layer and the inner layer. The filler is formed by agitating dry down-feathers and manmade fibers with a predetermined ratio in an agitating chamber. The sizes of the fibers are between 0.71 deniers to 0.91 deniers and lengths are between 22 to 26 mm. A plurality of lattices with sizes of 8 inches×10 inches are formed on the outer layer and inner layer. A weight ratio of the fiber is below 50% of the filler. Furthermore, a down-feather and manmade fiber mixed filler is disclosed. The filler is formed by agitating dry down-feathers and manmade fibers with a predetermined ratio in an agitating chamber; sizes of the manmade fibers being between 0.71 deniers to 0.91 deniers and a length between 22 to 26 mm.

9 Claims, 2 Drawing Sheets

DOWN-FEATHER AND MANMADE FIBER MIXED FILLER AND PRODUCT MANUFACTURING FROM THE SAME

FIELD OF THE INVENTION

The present invention relates to down-feather and manmade mixed fillers, and in particular to a down-feature and manmade fiber mixed filler and a down-feather and fiber filled product, which has preferred properties of keep warming and ventilation, but only a small amount of down-feathers are used so that the cost is reduced greatly.

BACKGROUND OF THE INVENTION

Down-feather products are popular due to the preferred warm keeping and ventilation abilities. However the supply of down-feathers becomes less and thus the price is increased. Thereby to add fibers into the down-feathers has become a trend under the consideration of cost.

In the prior art, down-feathers are not suitable to be mixed with fibers because they will separate easily. Furthermore, they will collect to form a plurality of collection blocks if the mixing material is washed. Thereby the down-feathers and fibers are not suitable to be mixed as fillers.

In U.S. Pat. No. 6,232,249, a special process is disclosed for mixing down-feathers and fibers. In that, short fibers will be hooked to the down-feathers. In the process, short fibers are curled. The process includes the steps of mixing short fibers with down-feathers by agitation in a chamber and surface activator as a soften agent is added therein so that the short fibers are curled; and then dewatering and drying the fibers and thermally setting the mixing material.

In this process, the down-feathers and the fibers can be uniformly mixed. However in the process, the down-feathers and the fibers must be mixed firstly and soften agent is added therein. Then dewatering, drying and thermal setting process are performed. The process is complicated and the cost is high.

SUMMARY OF THE INVENTION

Accordingly, the primary object of the present invention is to provide a down-feather and manmade fiber filled product, which has preferred properties of keep warming and ventilation, but only a small amount of down-feathers are used so that the cost is reduced greatly.

To achieve above objects, the present invention provides a down-feather and manmade fiber filled product having an outer layer, an inner layer, and a filler filled between the outer layer and the inner layer. The filler is formed by agitating dry down-feathers and manmade fibers with a predetermined ratio in an agitating chamber. Sizes of the manmade fibers are between 0.71 deniers to 0.91 deniers and lengths of the manmade fibers are between 22 to 26 mm. A plurality of lattices with a size of 8 inches×10 inches are formed on products. A weight ratio of the fiber is below 50% of the filler. In agitation, ozone is added to the filler.

Furthermore, a down-feather and manmade fiber mixed filler is disclosed. The filler is formed by agitating dry down-feathers and fibers with a predetermined ratio in an agitating chamber. Sizes of the fibers are between 0.71 deniers to 0.91 deniers and a length between 22 to 26 mm.

The various objects and advantages of the present invention will be more readily understood from the following detailed description when read in conjunction with the appended drawing.

DETAILED DESCRIPTION OF THE INVENTION

In order that those skilled in the art can further understand the present invention, a description will be described in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
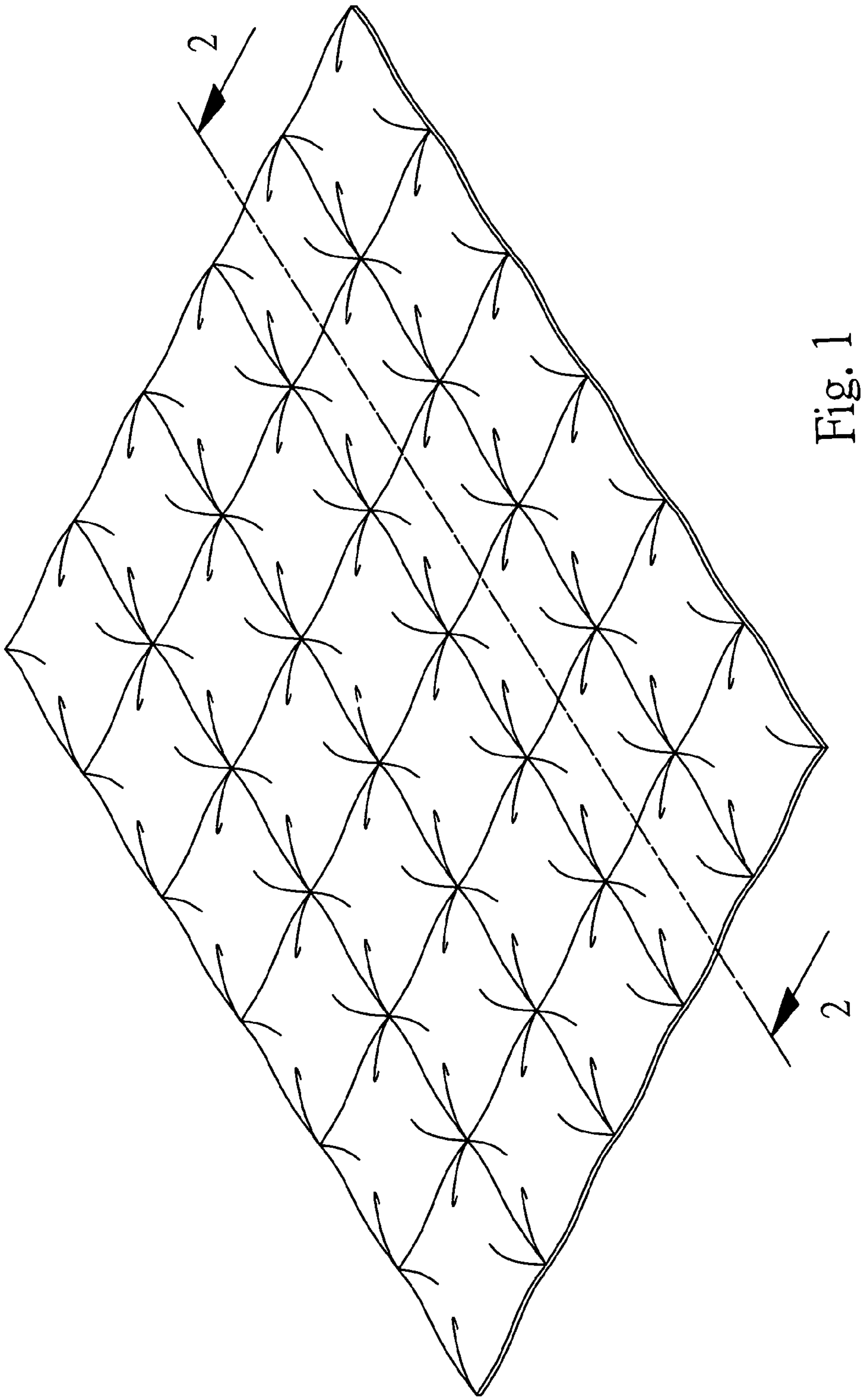
FIG. 1 is a schematic perspective view of the present invention.
Figure 2:
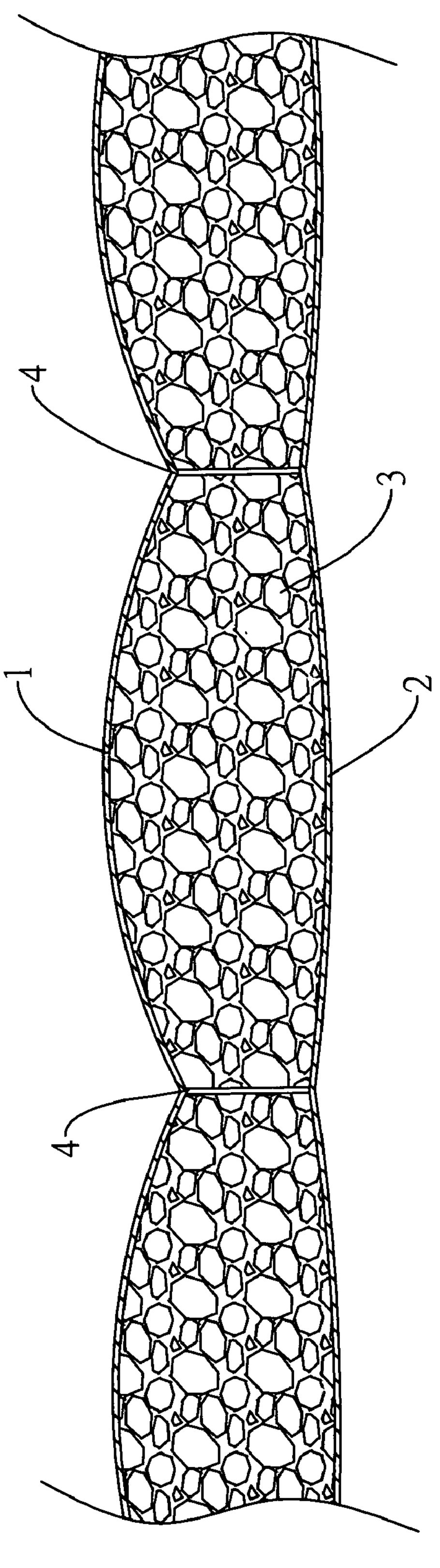
FIG. 2 is a schematic cross sectional view along line 2-2 of FIG. 1.

Referring to FIGS. 1 and 2, the down-feather and manmade fiber filled device of the present invention is illustrated. The present invention has an outer layer 1, a filler 2 and a inner layer 3. The manmade filler 2 is formed by agitating down-feathers and manmade fibers according to a predetermined ratio in an agitating chamber. In the chamber, ozone can be added therein for achieving the object of odor-removing and sterilization.

The chamber has a length of 6.3 meters, a width of 5.4 meters, and a height of 3.6 meters. The chamber has two shafts. Each shaft has 13 agitating plates (in total, there are 26 agitating plates). The power of shaft is 12 kilowatts per minute with a rotation speed of 45 circles per minute. The material can be filled from two sides of the chamber.

The manufacturing process of the present invention comprise the steps of: filling down-feathers and manmade fibers into a chamber with a predetermined ratio; agitating the down-feathers and manmade fibers and adding ozone thereto through a time period of about 40 minutes; assuring the down-feathers and manmade fibers being mixed uniformly; and cleaning the chamber for being used next time.

In the present invention, the size of the fiber is 0.71 deniers to 0.91 deniers with a length between 22 to 26 mm. The manmade fiber is dried and agitated with the down-feather to be as the manmade filler 2. Then the manmade filler 2 is filled between the outer layer 1 and the inner layer 3.

The product can be seamed with lattices having a size of 8 inches×10 inches. The indication 4 is the drawing is the seaming portion.

Furthermore, in the present invention, a down-feather and manmade fiber mixed filler is disclosed. The manmade filler is formed by agitating dry down-feathers and fibers with a predetermined ratio in an agitating chamber. Sizes of the manmade fibers are between 0.71 deniers to 0.91 deniers and a length between 22 to 26 mm.

In the present invention, a weight ratio of the manmade fiber is below 50% of the filler. Furthermore, the manmade fiber may be selected from polyfiber.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A down-feather and manmade fiber filled product having an outer layer, an inner layer, and a filler filled between the outer layer and the inner layer; wherein the filler is formed by agitating dry down-feathers and manmade fibers with a predetermined ratio in an agitating chamber; sizes of the manmade fibers are between 0.71 deniers to 0.91 deniers and a length between 22 to 26 mm.

2. The down-feather and manmade fiber filled product as claimed in claim 1, wherein a plurality of lattices with a size of 8 inches×10 inches are formed on the down-feather and manmade fiber filled product.

3. The down-feather and manmade fiber filled product as claimed in claim 1, wherein a weight ratio of the manmade fiber is below 50% of the filler.

4. The down-feather and manmade fiber filled product as claimed in claim 1, wherein in agitation, ozone is added to the filler.

5. The down-feather and manmade fiber filled product as claimed in claim 1, wherein the manmade fiber is polyfiber.

6. A down-feather and manmade fiber mixed filler; the filler being formed by agitating dry down-feathers and manmade fibers with a predetermined ratio in an agitating chamber; sizes of the manmade fibers being between 0.71 deniers to 0.91 deniers and a length between 22 to 26 mm.

7. The down-feather and manmade fiber filled product as claimed in claim 1, wherein the fiber is polyfiber.

8. The down-feather and manmade fiber mixed filler as claimed in claim 6, wherein a weight ratio of the manmade fiber is below 50% of the filler.

9. The down-feather and manmade fiber mixed filler as claimed in claim 8, wherein in agitation, ozone is added to the filler.

* * * * *